United States Patent [19]

Fujii

[11] 4,328,843

[45] May 11, 1982

[54] PRESSURIZED DISPENSERS FOR DISPENSING PRODUCTS UTILIZING A PRESSURE TRANSFER FLUID

[76] Inventor: Minoru Fujii, 5601 - 52nd Ave. S., Seattle, Wash. 98118

[21] Appl. No.: 111,267

[22] Filed: Jan. 11, 1980

Related U.S. Application Data

[60] Division of Ser. No. 880,619, Feb. 2, 1978, Pat. No. 4,202,470, which is a continuation-in-part of Ser. No. 775,098, Mar. 7, 1977, abandoned.

[51] Int. Cl.³ .................. B65B 3/04; B65D 83/14
[52] U.S. Cl. ............................... 141/1; 141/3; 141/20; 141/98; 222/130; 222/386.5
[58] Field of Search ............ 141/1, 3, 2, 98, 20; 222/95, 136, 386.5, 387, 389, 394, 399, 94; 53/470; 239/307, 308; 401/152–155

[56] References Cited

U.S. PATENT DOCUMENTS

| | | | |
|---|---|---|---|
| 3,169,670 | 2/1965 | Hrebenak et al. | 222/95 |
| 3,417,901 | 12/1968 | Sands | 222/95 |
| 3,477,195 | 11/1969 | Chambers | 53/37 |
| 3,572,402 | 3/1971 | Beffel | 141/3 |
| 3,654,743 | 4/1972 | McGeary | 53/88 |
| 4,108,219 | 8/1978 | Shulsinger | 141/3 |

*Primary Examiner*—Houston S. Bell, Jr.
*Attorney, Agent, or Firm*—Seed, Berry, Vernon & Baynham

[57] ABSTRACT

Reusable pressurized containers are disclosed for dispensing fluids from the container without release of the pressurized propellant to the surrounding environment. The propellant is contained in a sealed, flexible compartment positioned within the container as a mixture of gas and liquid under pressure in equilibrium at the temperature of the container. A pressure transfer liquid, such as water, is used to liquefy the propellant in the compartment. The pressure transfer fluid also contacts the fluid or semi-solid to be dispensed and exerts pressure thereon to force the fluid to be dispensed out of the container. The liquefied propellant, as it vaporizes, maintains the pressure against the pressure transfer fluid essentially constant. The propellant in the flexible compartment is preferably a mixture of a liquefiable propellant gas or blend thereof and a nonliquefiable inert gas such as nitrogen or helium.

18 Claims, 14 Drawing Figures

PRESSURIZED DISPENSERS FOR DISPENSING PRODUCTS UTILIZING A PRESSURE TRANSFER FLUID

This is a division, of application Serial No. 880,619, filed February 2, 1978, now U.S. patent No. 4,202,470 which is a continuation-in-part of application Ser. No. 775,098, filed March 7, 1977, now abandoned.

BACKGROUND OF THE INVENTION

1. Field of the Invention

This invention relates to reusable pressurized containers for dispensing fluids without release of the liquefiable propellant used to dispense the fluid to the surrounding atmosphere, to a method of making such containers and to fluid reservoir systems employing a pressurized liquefiable propellant.

2. Description of the Prior Art

Dispensing containers are widely used to dispense a myriad of products. Conventional pressurized dispensers generally use a propellant in solution with the product to be dispensed which is usually discharged along with the product into the atmosphere and which evaporates instantly upon discharge, helping break the product into a fine mist. The propellants commonly used include halogenated hydrocarbons, such as difluorodichloromethane and dichlorotetrafluoroethane, and aliphatic hydrocarbons, such as propane, isobutane, n-butane and mixtures thereof.

Recent concern has been expressed by scientists about the effects of discharge of fluorocarbon propellants into the atmosphere where they accumulate in the upper atmosphere and cause possible depletion of the ozone layer enveloping the earth. Such concern has resulted in regulations to curtail the use of such propellants. Hydrocarbon propellants such as propane, isobutane, butane and others, while not creating an environmental problem, pose a safety hazard during storage and transportation because of their combustability, particularly when the container is discarded when not completely empty.

It is expected that free discharge of fluorocarbons into the atmosphere will be banned world-wide in the near future. Except for personal products and some food products, most of the users of fluorocarbon propellants are expected to switch to hydrocarbon propellants. Should this switchover take place, annual consumption of propane and isobutane as propellants would increase from 100,000,000 pounds in 1971 to more than 1,000,000,000 pounds in the near future, equivalent to about 24 billion cu. ft. of natural gas at atmospheric pressure in the United States alone. This is a significant amount of fuel on an annual basis which could be better used to supply factories and provide employment. At the same time, probable safety hazards from the use of more hydrocarbon-filled aerosol cans will increase many times as fluorocarbon use will likely be phased out in blending with hydrocarbon propellants to reduce their flammability as a flame suppressant. With the containers described herein, the total consumption of hydrocarbons could be a very small fraction of one percent of that used at present.

From the standpoint of (1) environmental protection of the ozone layer, (2) conservation of fuel energy, and (3) safety for the consumer and the public, the containers described herein are a solution to a serious problem.

Dispensers such as those disclosed in U.S. Pat. Nos. 3,460,714; 3,578,210; 3,815,793; and 3,858,764, release the propellant into the atmosphere with the product to be dispensed.

U.S. Pat. No. 3,417,901 describes a reusable pressurized dispenser wherein a propellant which can be liquefied in a home refrigerator and which boils below operating temperature, is sealed in a flexible container in contact with the material to be dispensed. The propellant, when warmed to ambient temperature, forces the material to be dispensed out of the container. The container is refilled by cooling the container to liquefy the propellant and then opening the container to add more material to be dispensed.

U.S. Pat. No. 2,930,513 describes a pressurized liquid dispenser employing a compressed air propellant.

U.S. Pat. No. 3,233,791 utilizes a propellant operated gel piston which is prone to leakage with release of the propellant to the atmosphere as the product is dispensed.

U.S. Pat. No. 3,659,395 utilizes a closed cell foam material within a container. Propellant is injected into the container under pressure which diffuses through the walls of the foam into the foam cells. The product to be dispensed is then injected under pressure into the container. The propellant is not sealed but is released as the product is dispensed.

There remains a need for a pressurized dispenser which can be reused repeatedly without release of the propellant to the atmosphere which can be manufactured economically.

Pressurized fluid reservoir systems currently used in the industry are, in some instances, of inadequate holding capacity for the same size unit and are not constant pressure systems.

SUMMARY OF THE INVENTION

This invention is directed to pressurized power systems for fluids, including reusable pressurized containers for dispensing fluids without release of the pressurized propellant within the container to the surrounding environment, method of making such and pressurized fluid reservoir systems including means for maintaining the fluid pressure substantially constant. With respect to pressurized containers, a container having a valved outlet holding the product to be dispensed contains a permanently sealed compartment having a propellant gas impermeable, flexible wall holding a pressurized, liquefiable propellant or mixture of liquefiable propellant and non-liquefiable gas. The liquefiable propellant is generally a mixture of gas and liquid at the use temperature of the container when the container is not completely empty of product. The propellant is liquefiable under the influence of temperature, pressure or both. The container may also be designed to accommodate a pressurized transfer fluid (liquid or non-propellant gas), which contacts both the flexible wall holding the propellant and the product to be dispensed directly or indirectly, the pressurized transfer fluid transmitting sufficient pressure from the propellant to the product to be dispensed to force the product out of the container through the valved outlet.

The pressurized fluid reservoir systems described herein comprise a housing having an opening for receiving the pressurized fluid. A permanently sealed compartment having a flexible wall is positioned within the housing and holds a liquefiable propellant gas, blend thereof, or a mixture of a liquefiable propellant gas or blend thereof and a non-liquefiable gas. The flexible wall separates the propellant and pressurized fluid.

It is a primary object of this invention to provide a pressurized dispenser for dispensing products without release of the propellant to the surrounding atmosphere.

It is another object of this invention to provide a fluid system including a fluid reservoir and a compartment within the reservoir enclosing a liquefiable propellant gas, blend thereof, or a mixture of a liquefiable propellant gas and non-liquefiable gas at the use temperature of the fluid system, the compartment having a flexible wall which is impermeable to the liquefiable propellant enclosed therein.

It is a further object of this invention to provide a method and means of damping pressure pulsations in a fluid system.

It is a further object of this invention to provide a method and means of maintaining and stabilizing the pressure within a fluid system.

It is a further object of this invention to provide a method and means of compensating for fluid pressure loss or fluid loss in a fluid system.

It is a further object to provide a method of dispensing fluids from a container by enclosing a mixture of gases within a compartment having a flexible wall in contact with the fluid to be dispensed, the mixture of gases including at least one liquefiable propellant gas and at least one other non-liquefiable gas.

It is a further object of this invention to provide a pressurized dispenser wherein the liquefiable propellant can be used repeatedly.

It is a further object of this invention to provide a pressurized dispenser wherein the liquefiable propellant is sealed in a compartment having a flexible, wall positioned in a separate container from the product to be dispensed by the liquefiable propellant.

It is a further object of this invention to provide a pressurized dispenser wherein pressure for dispensing the product is transferred to the product through a liquid or gas pressure transfer fluid.

It is a further object of this invention to provide a pressurized dispenser wherein pressure for dispensing the product by the propellant is transferred to the product through a liquid or gas pressure transfer fluid and wherein the liquefiable propellant is reusable by liquefaction of the propellant through pressure exerted thereon by the pressure transfer fluid. For high pressure systems, the propellant may be cooled to a level where the available pressure through the pressure transfer fluid is sufficient to liquefy the propellant.

It is a further object of this invention to provide a method of making a pressurized dispenser employing a cellular foam material containing a liquefiable propellant gas.

BRIEF DESCRIPTION OF THE DRAWINGS

FIGS. 13 and 14 are comparative pressure/volume graphs for a fluid system of the type shown in FIG. 12. FIG. 13 illustrates a system wherein the bladder or foam material is filled with a non-liquefiable gas. FIG. 14 illustrates a system wherein the bladder or foam material is filled with a mixture of a liquefiable propellant gas or blend thereof and non-liquefiable gas.

DETAILED DESCRIPTION OF THE PREFERRED EMBODIMENTS

"Liquefiable propellant" used herein means a compound or mixture of compounds having a boiling point or boiling range such that the vapor pressure of the compound or mixture of compounds at the use temperature or temperature range is equal to the pressure exerted by the propellant which is wanted.

"Non-liquefiable gas" as used herein means a compound or mixture of compounds compatible with and inert with respect to the liquefiable propellant and having a boiling point or boiling range sufficiently different from that of the liquefiable propellant that it is not liquefiable at the temperatures and/or pressures which the dispenser or fluid system is to be operated.

Figures 1, 2, 3, 4:
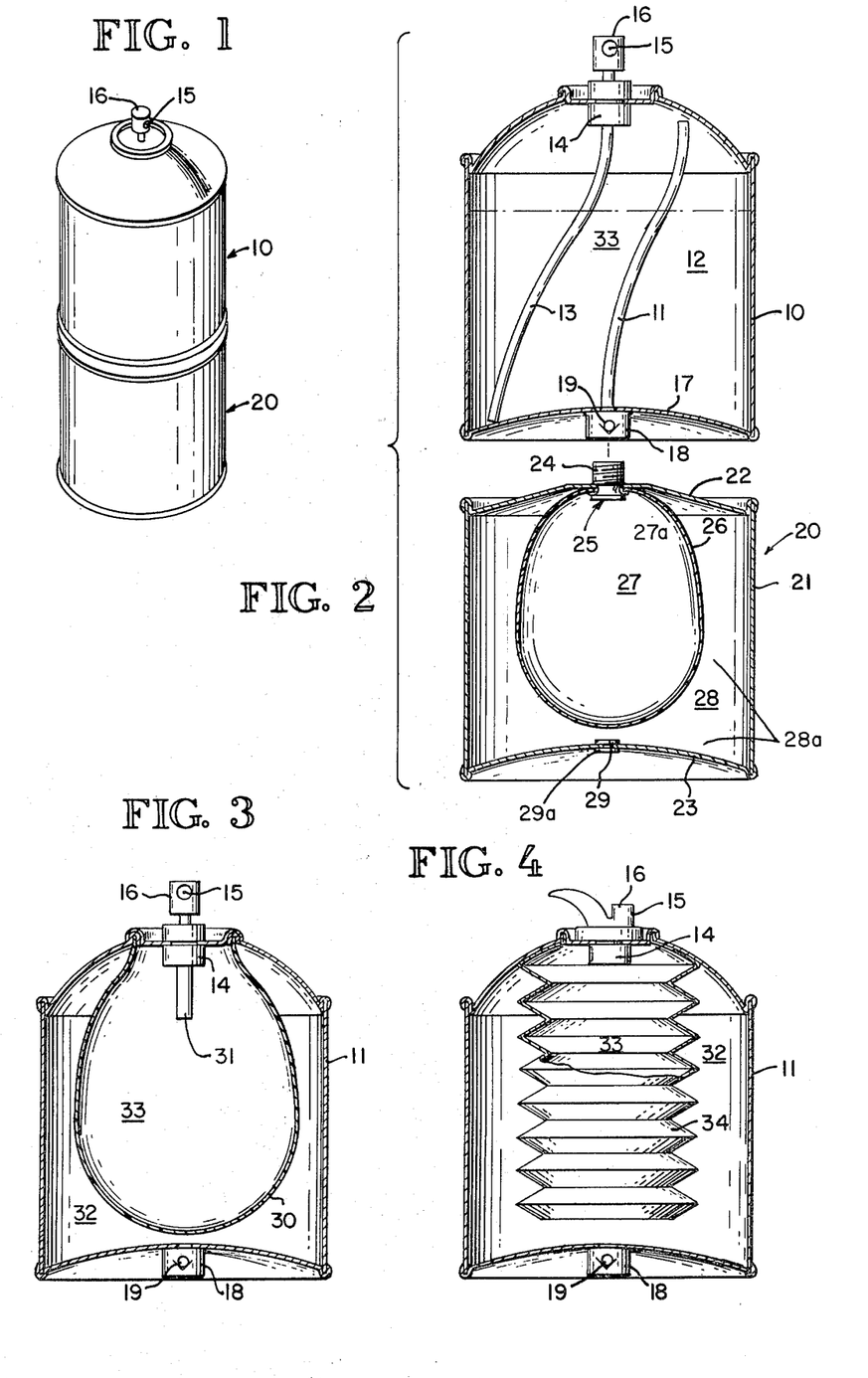
FIG. 1 is a perspective view of one embodiment of a pressurized dispenser embodying the invention hereof.
FIG. 2 is a vertical cross section of one embodiment of a pressurized dispenser having a top portion containing the product to be dispensed and a separate lower portion containing the liquefiable propellant and a pressurized transfer fluid.
FIG. 3 is a vertical cross section of an alternative embodiment of the upper portion of FIG. 2.
FIG. 4 is a vertical cross section of a conventional Sepro-can container which may be used in conjunction with the lower portion of FIG. 2.

FIG. 1 shows a container which may be separated into an upper container 10 and a lower container 20, the upper container having a finger actuator 16 for delivery of the material to be dispensed through dispensing nozzle 15. Different embodiments of the upper container are illustrated by FIGS. 2, 3, 4 and 5. In each of these the liquefiable propellant, or mixture of liquefiable propellant and non-liquefiable gas at the desired operating temperature range of the dispenser, is liquefied under the influence of pressure, temperature or both and is sealed in a compartment having a flexible wall which is not permeable to the liquefiable propellant gas. A pressure transfer fluid, such as water, compressed air or other inert gas such as carbon dioxide, may be used to liquefy the propellant in the compartment. The pressure transfer fluid is in contact with the flexible wall of the compartment holding the propellant so that the pressure exerted by the pressure transfer fluid on the propellant in the compartment liquefies the propellant. The propellant in the compartment, after injection of the pressure transfer liquid, exerts a constant and sufficient pressure against the pressure transfer fluid in contact with the product to be dispensed to force the product out through the valved outlet of the container when the valve is opened.

Referring specifically to FIG. 2 the upper container 10 has a product chamber 12 which includes a dip tube 13 extending downwardly to the bottom of the container from valve 14 which controls the flow of the product 33 to be dispensed from dispensing nozzle 15 by the finger actuator 16. The lower wall 17 of the container includes an opening surrounded by an annular, internally threaded projection 18 and may have a conventional one-way, spring-loaded valve 19 therein. The valve 19 may be of the type used for tire tubes, although other type valves may be used. In many applications, valve 19 may be omitted. A tube 11 may be secured over the valve 19 in the lower container wall 17 for some applications. The tube 11 extends upwardly from the opening in lower wall 17 to near the top of the container 10.

The lower container 20 includes side walls 21, top wall 22 and bottom wall 23. An annular, externally threaded projection 24, surrounding an opening 24a in the top wall, has a valve 25 therein of the same type as valve 19. A flexible bag 26 is clamped around the opening 24a in the top wall to form a transfer fluid compartment 27 holding the pressure transfer fluid 27a. A propellant chamber 28 between the flexible bag 26 and the walls 21, 22 and 23 of the container holds a liquefiable propellant 28a. The propellant is charged into the container through an inlet opening 29 sealed with a plug 29a of resilient material.

The locking system for securing the lower container 20 holding the pressure transfer fluid 27a and propellant 28a to the upper container 10 may be of several types, all known and obvious to one skilled in the art. The means for clamping the flexible bag 26 around the opening 24a in the top wall 22 of lower container 20 may be by means other than as illustrated. For example, an annular projection extending from the lower end of projection 24 may be fitted with an annular detent and a ring used to clamp the flexible bag 26 around the projection 24. Other ways of sealing the bag may also be used. The bag holding the pressure transfer fluid may be made of any convenient material provided it is substantially impermeable to the propellant used, is sufficiently flexible for the purposes described and is compatible with the pressure transfer fluid and propellant.

Alternatively, the flexible bag 26 may be secured around the inlet opening 29 to receive and contain the propellant 28a, and the pressure transfer fluid 27a introduced through valved 25.

After manufacture of the lower container 20 an appropriate amount of propellant 28a is injected into the propellant chamber 28 through the inlet opening 29 and the inlet opening sealed with a plug 29a. With the embodiment shown in FIG. 2 compressed air, carbon dioxide or other inert gas not environmentally detrimental if released to the atmosphere, is used as the pressure transfer fluid 27a. The source of compressed air may be from a service station air hose, a portable compressor or by use of the device shown in FIG. 8 using water to compress the air, or other known gas pressure storage means.

Using an appropriate fitting, compressed air or other gas is introduced into the transfer fluid compartment 27 through the valve 25, the compressed gas exerting sufficient pressure on the propellant 28a in the propellant chamber 28 through the wall of flexible bag 26 to liquefy a portion or substantially all of the propellant 28a in compartment 28. The valve 25 may be a spring-loaded valve which closes to prevent loss of the air pressure from the transfer fluid chamber 27 when filling is complete. The upper container 10, filled with the product 33 to be dispensed, is then connected to the lower container 20 by connecting the two containers together as illustrated. The annular, internally threaded projection 18 mates with the annular, externally threaded projection 24 as illustrated in FIG. 2. When the upper and lower containers are connected the pins of the respective valves 19 and 25 contact and open each other to permit the pressurized transfer fluid 27a (in this instance gas) to enter the product chamber 12 of the upper container through tube 11 and pressurize the product 33 therein. If valve 19 is not provided, a stationary pin must be provided in its place to open the valve 25 when the upper and lower containers are connected. When the valve 14 of the container 10 is depressed the pressure above the product 33 forces the product out through the valve and nozzle 15. The propellant 28a in the propellant chamber 28 exerts a constant pressure on the pressure transfer fluid 27a contained in the compartment 27 which, in turn, exerts a constant pressure on the product 33 to be dispensed so that sufficient pressure is available to uniformly discharge all of the product 33 from the container 10. As the product 33 is dispensed, additional liquefied propellant vaporizes to maintain the pressure in the chamber 28 substantially constant. When the product 33 to be dispensed is exhausted the upper container 10 is disconnected from the lower container 20 and may be discarded or refilled. The lower container 20 may be reused by repressuring the container with a suitable gaseous pressure transfer fluid. Flexible, cellular material containing liquefiable propellant such as the one shown in FIG. 11 and described later may be substituted for propellant chamber 28 and the flexible bag 26.

FIG. 3 illustrates a modified form of upper container 10 in which the product 33 to be dispensed is contained in a flexible bag 30, the bag clamped at its upper ends around the valve 14 of the container 10. The material for the flexible bag 30, in this instance, need not be impermeable to the propellant gas since it never comes into contact with the propellant 28a. A dip tube 31, which may not be needed for some applications, extends downwardly toward the bottom of the bag from its connection to the valve 14 controlling flow of the product to be dispensed from dispensing nozzle 15 on depression of finger actuator 16. This container also has a valved lower outlet similar to that described with regard to the upper container 10 of FIG. 2. The outlet may not need to be valved for many applications. A lower container 20 of the type described with reference to FIG. 2 may be used in conjunction with the container illustrated in FIG. 3. The pressure transfer fluid 27a used with the upper container 10 of FIG. 3 may be either a compressed gas, such as compressed air or carbon dioxide or a liquid such as water. When using water, for example, transfer fluid comprtment 27 of the lower container 20 is filled with water under pressure, such pressure generally ranging from 5 to 80 psi or more from a convenient tap water source. The pressure exerted by the water on the propellant 28a in the propellant chamber 28 causes liquefaction of some or all of the propellant therein. If available water pressure is insufficient to liquefy the propellant 28a, the propellant may be cooled to allow a lower water pressure to liquefy the propellant. When the lower container 10 is connected to the upper container as described with reference to FIG. 2, the water under pressure flows into chamber 32 of the upper container 10 of FIG. 3 surrounding the flexible bag 30 and exerts pressure on the product 33 so that, on depression of the finger actuator 16 to open valve 14 the product is forced out through the dispensing nozzle 15. The propellant 28a in propellant chamber 28 exerts a substantially constant pressure on the water in transfer fluid compartment 27, this pressure being efficiently transmitted by the water to the product 33 contained in the flexible bag 30.

FIG. 4 illustrates an upper container 10 similar to the "Sepro" can manufactured by Continental Can Co. utilizing an accordion-like, flexible compartment 34 holding the product to be dispensed. When the container 10 of FIG. 4 is connected to the lower container 20 of FIG. 2 as previously described, the pressure transfer fluid 27a in transfer fluid compartment 27 enters chamber 32 and exerts pressure against the flexible compartment 34 to dispense the product 33. When the valve 14 is opened the product 33 is forced out through the dispensing nozzle 15. The embodiment illustrated in FIG. 4 is useful for dispensing some low viscosity products at low pressures or viscous products at high pressures, such as cheese spreads, syrup, honey, etc.

Water is a preferred transfer fluid because it is, for all practical purposes, incompressible, and transmits pressure efficiently; however, other liquids may be used as long as they are compatible with the overall system.

If desired, means may be included with the valves of the various embodiments to produce a fine spray. For example, the orifice leading from the valve 14 of FIGS. 2 and 3 may include mechanical means such as swirl chamber to break up the material being dispensed. Alternatively, a vapor tap orifice inside the container, a tapered orifice, an air tap orifice on the spray head outside the can or dissolved gas such as carbon dioxide in the product to be dispensed may be employed.

In contrast to the use of pressure, cooling may be used to condense the propellant 28a in compartment 28 of the lower container of FIG. 2. When the pressure transfer fluid 27a is air, the ambient gas trapped in compartment 27 is pressurized when the container 20 is warmed to a temperature at which the propellant begins to vaporize. The valves 19 and 25 of FIG. 2 are opened when the upper and lower containers 10 and 20 are connected. The propellant 28a in propellant chamber 28 exerts sufficient pressure on the compressed gas in compartment 27 to force the product 33 to be dispensed from the upper container 10. Pressure has definite advantages over cooling since cooling takes a great deal of time. Also, some products to be dispensed have temperature restrictions such that, to dispense the product, the container holding the propellant must be warmed up to ambient temperature before it can be connected to the container holding the product to be dispensed.

Figure 5:
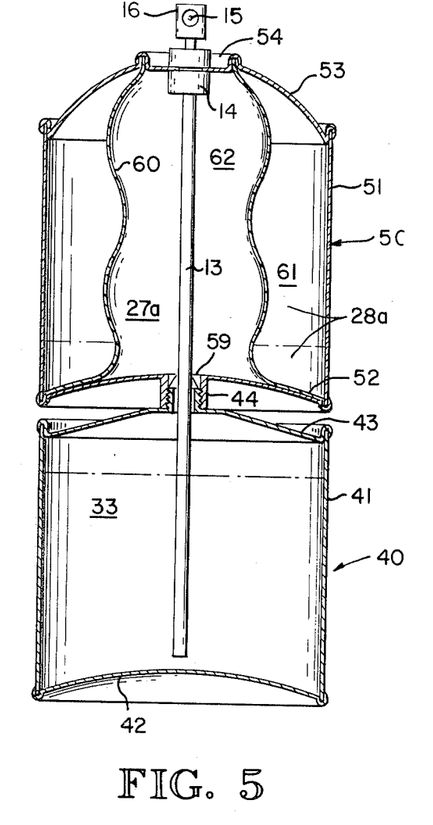
FIG. 5 is a vertical cross section of an embodiment of the invention wherein the product to be dispensed is contained in the lower container and the liquefiable propellant and pressure transfer fluid are contained in the upper container.

FIG. 5 illustrates an alternate embodiment wherein the product 33 to be dispensed is housed in a lower container 40 and the propellant 28a and pressure transfer fluid 27a are housed in an upper container 50. The lower container 40 has side walls 41, lower wall 42 and an upper wall 43, the upper wall including an opening therein around which is secured an annular, externally threaded projection 44. The upper container 50 includes side walls 51, lower walls 52 and upper wall 53, the upper wall including a valve support member 54 clamped to the upper wall 53 and supporting a valve 14 which controls product flow from dispensing nozzle 15 by depression of the finger actuator 16. A dip tube 13 extends downwardly through a sealed opening 59 in the lower wall 52 of the upper container 50. A valve may be included in the opening 59 so that the transfer fluid chamber 62 can be pressurized with a pressure transfer fluid 27a. A flexible wall 60 is clamped at its lower end in the upper container 50 where the side wall 51 and lower wall 52 intersect and at its upper end where the upper wall 53 and the valve support member 54 intersect to separate upper container 50 into propellant chamber 61 containing the propellant 28a and transfer fluid chamber 62 receiving the transfer fluid 27a. If no valve is provided in opening 59 the propellant 28a may be liquefied by cooling. Before the upper container 50 is warmed appreciably it is connected to the lower container 40 containing the product 33 to be dispensed, as illustrated in FIG. 5. As the upper container 50 warms and the propellant 28a vaporizes, it exerts sufficient pressure on the air contained in upper transfer fluid chamber 62 through the flexible wall 60, and the air exerts sufficient pressure on the product 33 to be dispensed in the lower container 40, to force the product 33 out through the dip tube 13 and dispensing nozzle 15 on opening of the valve 14 by depression of the finger actuator 16.

Flexible cellular material containing liquefiable propellant such as the one shown in FIG. 11 and described later may be substituted for propellant chamber 61 and the flexible wall 60.

Figure 6:
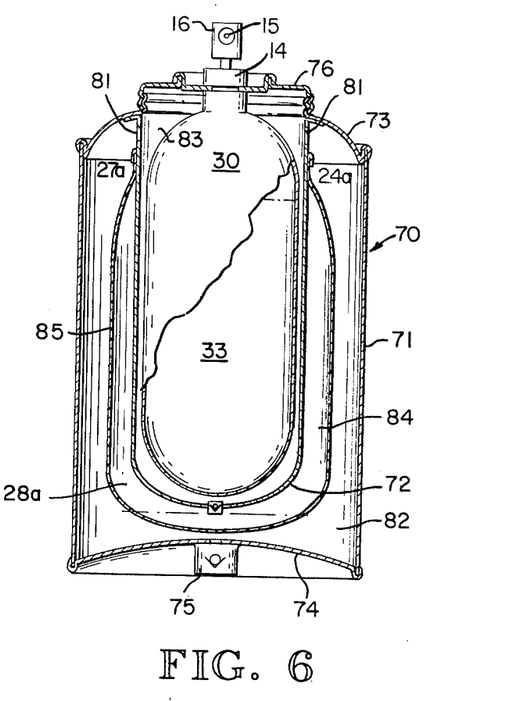
FIG. 6 is a vertical cross section of a pressurized dispenser wherein the product to be dispensed, the liquefiable propellant and pressurized transfer fluid are contained in a single, integral container.

FIG. 6 illustrates an embodiment of the invention utilizing an integral container 70 having an outer wall 71, an inner container 72, a top wall 73 having a threaded opening therein and a lower wall 74 having a valved opening 75 therein. The inner container 72 is secured to the top wall 73 by suitable means. A threaded member 76 screws over the opening in the top wall 73, the threaded member supporting a valve 14 which controls flow of the product 33 to be dispensed from a flexible bag 30 through nozzle 15 when the finger actuator 16 is depressed. The bag 30, containing the product 33 to be dispensed, is secured at its upper end around the valve 14. An inner container 72 of the container has openings 81 therein so that pressure transfer fluid 27a in the chamber 82 is free to flow into the space 83 surrounding the bag 30. Propellant chamber 84 formed by the inner container 72 and a flexible wall 85, secured at its upper end to the inner container 72, holds the propellant 28a. A flexible cellular material holding the propellant may be substituted for this propellant chamber 84. The pressure transfer fluid 27a is injected into the container through valved opening 75 and exerts sufficient pressure against the flexible wall 85 or cellular material to liquefy the propellant 28a contained in the propellant chamber 84. The pressure transfer fluid 27a also exerts pressure against the flexible bag 30 through openings 81. When the finger actuator 16 is depressed the product 33 is forced by substantially constant pressure through the valve 14 out through dispensing nozzle 15. As the propellant 28a in propellant chamber 84 vaporizes it exerts a continuous constant pressure against the pressure transfer fluid 27a in chamber 82 which, in turn, exerts pressure against the product 33 to be dispensed, resulting, ultimately, in discharge of substantially all of the product 33 contained in the flexible bag 30.

Figure 7:
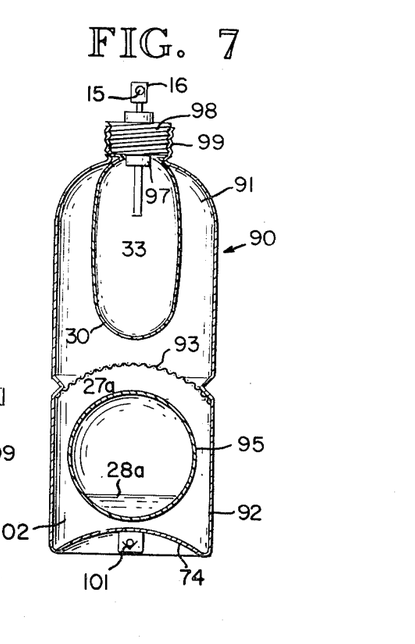
FIG. 7 is a vertical cross section of an embodiment of the invention like FIG. 6.

FIG. 7 illustrates a further embodiment of this invention utilizing an integral container 90 having an upper threaded opening 99 and a lower wall 74 divided into an upper portion 91 and lower portion 92 by a foraminous barrier 93. The propellant 28a is contained in a flexible compartment 95 located in the lower portion 92 of the container 90. The product 33 to be dispensed is held in a flexible bag 30 secured at its upper end around a valved outlet 97. The valved outlet 97 is supported by a threaded member 98 threadedly secured in the opening of container 90. The lower wall 74 has a valved outlet 101 therein. A pressure transfer fluid is injected under pressure into the chamber 102 to exert sufficient pressure against the flexible compartment 95 to liquefy a substantial amount of the propellant 28a contained therein. Flexible cellular material may be substituted for the flexible compartment 95. The pressure transfer fluid 27a exerts pressure against the flexible bag 30 holding the product 33. When the finger actuator 16 is depressed to open the valve in valved outlet 97 the product 33 is forced out through the valved outlet and dispensing nozzle 15. As the liquefied propellant 28a in flexible copartment 95 vaporizes it exerts a continuous, substantially constant pressure against the pressure transfer fluid 27a in chamber 102 which, in turn exerts a continuous, substantially constant pressure against the product 33 in flexible bag 30.

Figures 8, 9:
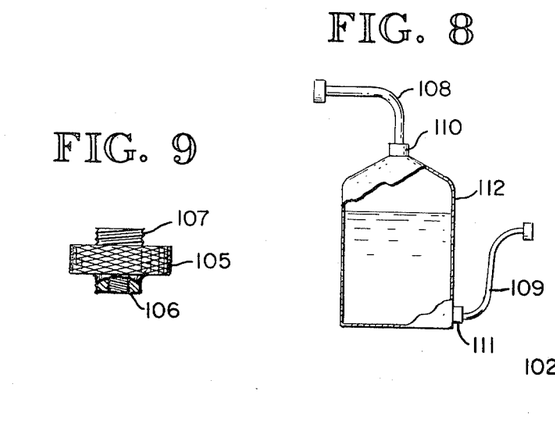
FIG. 8 is a vertical cross section of one means of providing compressed air to a container as the pressurized transfer fluid.
FIG. 9 is a side elevational view of one means for connecting the container holding the pressurized transfer fluid to a source of transfer fluid under pressure.

FIG. 9 illustrates one form of a coupling which may be used to connect a source of pressurized transfer fluid, such as water, with the container designed to hold the pressure transfer fluid and propellant. The device consists of a base 105, on one side of which is cut a female thread 106 designed to connect with the threaded connector on the container and on the other side of which is cut a male thread 107 designed to connect with a conventional water faucet connection. In the embodiment shown the female thread 106 is adapted to be connected to the externally threaded projection 24 of the lower container 20 of FIG. 2.

FIG. 8 illustrates a simple means of providing compressed air as a pressure transfer fluid. Tubes 108 and 109 are secured, respectively, to the openings 110 in the upper end and 111 in the lower end of container 112. The lower tube 109 is connected to a source of water under pressure. The upper tube 108 is connected to the valved outlet of, for example, the lower container 20 illustrated in FIG. 2. When water enters the container 112 the air above the level of the water is compressed and forced out through tube 108 under pressure into the transfer fluid compartment 27 of the lower container 20.

With the pressurized dispensers disclosed there is no discharge of propellant into the atmosphere. The propellant containers, such as the lower container 20 of FIG. 2, can be reused repreately.

Figure 10:
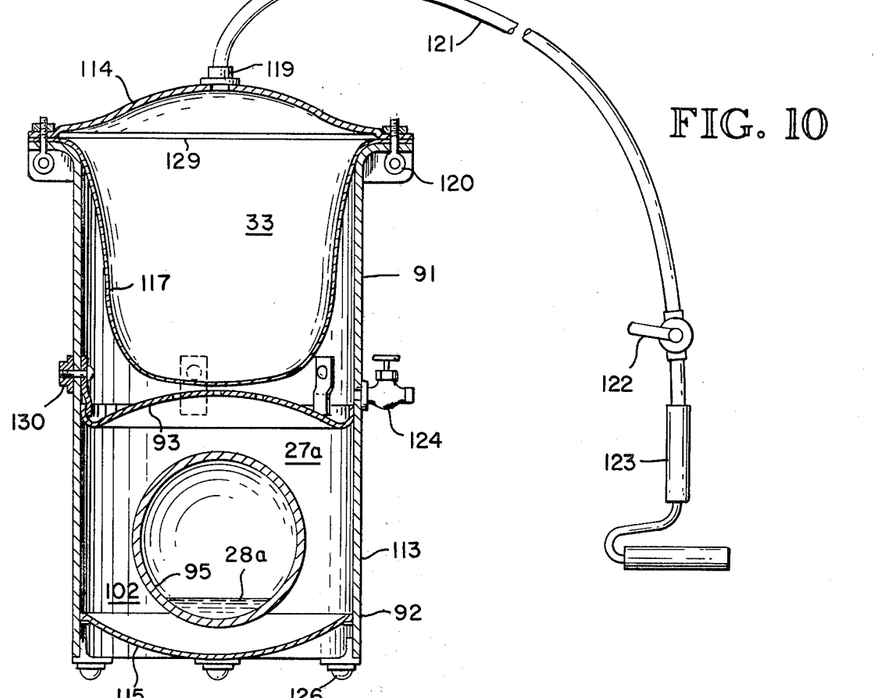
FIG. 10 is a vertical cross section of a pressurized dispenser for paint employing the inventive concept described herein.

FIG. 10 illustrates a further embodiment of this invention similar to FIG. 7 except on a larger scale and for a different end use, such as dispensing paint. The side walls 113 of the integral container are enclosed by an upper wall 114 and a lower wall 115. The container is divided by a foraminous wall 93 into an upper portion 91 and lower portion 92. The propellant 28a is contained in a flexible compartment 95 located in the lower portion 92 of the container. Flexible cellular material may be substituted for the flexible compartment 95. The product 33 to be dispensed is also held in a flexible bag 117 secured at its upper end around the periphery of and between the upper wall 114 and the side wall 113 by means of "O" ring 129 or other suitable sealing means and by means of bolts 120 or other suitable fastening means. The outlet 119 for the product 33 to be dispensed is located on top of the upper wall 114. The lower wall 115 is secured and sealed to side wall 113 by welding or other suitable means and the foraminous wall 93 is secured to the side wall 113 of the container by means of screws and anchor plates 130 as illustrated. The foraminous wall 93, however, may be secured permanently to the side walls 113 of the container and the lower wall 115 secured by similar means as the top wall 114. Casters 126 may be provided on the bottom of the container for easy handling during the dispensing of the product 33. An extension hose 121 is secured to the outlet 119. A flow regulator-stop valve 122 is provided toward the end of the extension hose 121 to which a spray gun or paint roller 123 or another device is connected. A pressure transfer fluid 27a, such as water, is injected under pressure through valve 124, located at the bottom of the upper portion 91 of the container, into the chamber 102. The pressure transfer fluid 27a exerts sufficient pressure against the flexible compartment 95 to liquefy a substantial amount of the propellant 28a contained therein. The pressure transfer fluid 27a also exerts pressure against the flexible bag 117 holding the product 33. When valve 122 is opened, the product is forced out through the hose 121 to the spray gun or paint roller 123, or other devices attached.

Figures 11, 12:
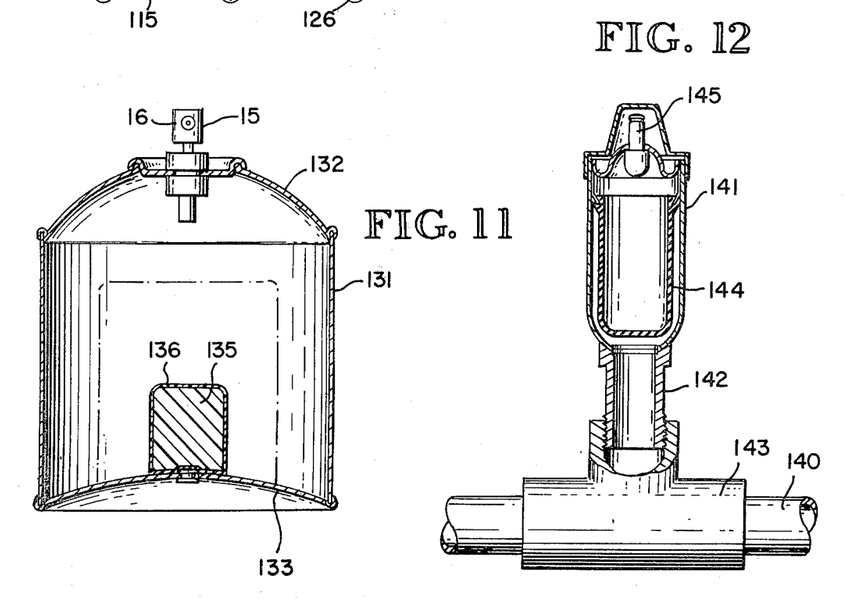
FIG. 11 is a vertical cross section of a pressurized dispenser utilizing a flexible, expandable, multi-cellular material within a container, the cellular material holding a liquefiable propellant, or a blend of liquefiable propellants, or a mixture of a liquefiable propellant or blend thereof and a non-liquefiable gas at the use temperature range of the dispenser.
FIG. 12 is a vertical cross section of a pressurized fluid system wherein a flexible, bladder is positioned within a fluid reservoir housing, the bladder containing a liquefiable propellant, blend of liquefiable propellants or a mixture of a liquefiable propellant or blend thereof and a non-liquefiable gas at the use temperature range of the fluid system.

The method of dispensing products using the systems illustrated in FIG. 11 differs from that described in U.S. Pat. No. 3,659,395 in that a liquefiable propellant or blend of liquefiable propellants in combination with a non-liquefiable gas are sealed within the foam.

FIG. 11 illustrates a modified form of the power unit which does not utilize a pressure transfer fluid as described with respect to the embodiments of FIGS. 1 to 7 and 10. FIG. 11 illustrates a container which may be made of glass or metal or any other suitable material. The side walls 131 of the container are enclosed by a top wall 132 and a bottom wall 133 which are secured around the side walls of the container in such a way that the container will withstand internal pressure. Suitable fastening means for fastening the top and bottom walls to the side walls are known and obvious to those skilled in the art. The top wall of the container is fitted with a dispensing nozzle 15 and finger actuator 16.

The liquefiable propellant, blend thereof or mixture of a liquefiable propellant and non-liquefiable gas is enclosed within a flexible member 135 which holds the propellant and is preferably impermeable thereto and which is compatible with the product to be dispensed. As illustrated in FIG. 11 the flexible member 135 is in a collapsed or near collapsed state due to the presence of the product to be dispensed in the container. The flexible member 135 may be made of a resilient multicellular foam material such as polyurethane, polyvinyl chloride, or polyethylene holding the liquefied the propellant in the individual cells. The foam material may be either a closed cell or open cell foam although a closed cell foam is preferred. Around the foam material 135 is a resilient covering 136 which is of a material substantially impermeable to the propellant used in and is compatible with the product to be dispensed. The lining or cover 136 may also be an integral skin layer formed during making of the flexible member foam material 135. As the product is dispensed the liquefied propellant in the cells of the multicelular material vaporizes and expands the foam material to force the product to be dispensed from the container.

A preferred method of making a pressurized dispenser of the type illustrated in FIG. 11 is to form the foam member 135 in situ by injecting an uncured polymer from which the foam is to be made, a catalyst for the polymer, a liquefiable propellant which may also serve as the foaming or blowing agent along with a non-liquefiable gas, inhibitors, surfactants, etc. into the container under pressure through an opening in the container wall. As the blowing agent vaporizes it develops cells in the mass of polymerizable foam and expands the polymer simultaneously with cure or crosslinking thereof to fill the interior of the container. The interior of the container, prior to injection of the foam, should be coated with a release agent such as a polyethylene film, a metal stearate or other conventional release agent. A lining 136 for the foam material should also be included unless the foam material is formed to have its own integral, surface skin or the foam is made of impermeable closed cells. The production of cellular plastic foams using physical foaming agents which are also liquefiable propellants is well known. Reference may be made, for example, to Modern Plastics Encyclopedia Vol. 50: No. 10A (October 1973) pp. 127–134 for a description of physical blowing agents and their use in the manufacture of plastic foams. Reference can also be made to pp. 134–137, 138–143 and 148–150 for a description of processes for making flexible elastomeric integral skin urethane foams, polyethylene foams and vinal foams.

After the foam has set in the container the product to be dispensed is injected into the container under pressure through the dispensing nozzle or other opening in the container to release the foam from the container walls and to collapse the foam and liquefy the propellant contained in the cells of the foam material 135. Thereafter, the foam material 135 exerts pressure on the product to be dispensed sufficiently to force the product from the container on depression of the finger actuator of the container.

Rahter than forming the foam in situ in the container the foam may be formed under pressure outside of the container and then inserted into the container under pressure. Likewise, the formed foam can be cooled sufficiently to liquefy the liquefiable propellant or blowing agent in the cells and the cooled foam then inserted into the container. With either of the two previously mentioned alternatives, the top or bottom wall of the container would not be secured to the container until the foam member 135 is inserted therein.

A similr process may be used in making accumulators of the type illustrated in FIG. 12 wherein a foam material is used in lieu of the flexible bag 144. The foam material may be foamed in situ in the housing 141 or foamed outside the housing and inserted in the housing as previously described with reference to FIG. 11.

With regard to the embodiment illustrated in FIG. 11 the flexible member 135 or flexible bag is charged with a mixture of a liquefiable propellant or blend thereof and a nonliquefiable gas in a volume ratio that depends on the particular application.

In all instances referred to with respect to FIGS. 1–7, 10 and 11 the flexible bag holding the propellant or the material to be dispensed which is in contact with the propellant should be made of material that is fairly impermeable to the propellant used and which is compatible with the propellant and with the product to be dispensed. The flexible bag or foam material holding the propellant should be ble to expand to approximately the full volume of the interior of the container in order to force the product to be dispensed from the container completely. If the bag is made of non-resilient but flexible material such as polyethylene and the bag is filled with liquefield propellant and collapsed to a crumpled form by the product to be dispensed or pressure transfer fluid, it leaves most of the container unfilled. As the liquefied propellant vaporizes the flexible bag expands until it agains approximately fills the container. The flexible bag may also be made of a rubbery, resilient or elastic material such as a natural or synthetic rubber which can shrink or expand according to the pressure exerted by the propellant. Suitable materials for holding the propellant or the product to be dispensed in contact with the propellant include synthetic rubber such as buna-N, Neoprene, butyl rubber, polybutadiene, ABS polymers, styrene-butadiene rubbers, the various acrylonitrile rubbers, natural rubbers and other flexible materials such as vinyl chloride, polyurethane, polyethylene, polypropylene, nylon and similar materials. In practicing the invention with the embodiments illustrated in FIGS. 1 to 11 with regard to dispensers, it is necessary to select a propellant which has a boiling point or blend of propellants which have a boiling point range below the temperature at which the reuseable container is to be used. The boiling point or range of the propellant or blend of propellants should not be so low that the propellant cannot be liquefied conveniently when recharging the container by use of a pressure transfer liquid for the product to be dispensed or in some instances by cooling. Generally, the boiling point of the propellant or blend of propellants should be higher than $-45°$ F. and preferably between $-25°$ F. and $50°$ F. Monochlorodifluoroethane sold under the trademark "Freon" 142b is suitable as one of the propellants either alone or blended with other propellants such as "Freon" 12, "Freon" 21, "F-114", etc. Rather than the fluorocarbon propellants, the various embodiments described may use an aliphatic hydrocarbon propellant such as propane, isobutane, n-butane, pentane or mixtures thereof chlorinated hydrocarbon propellants such as ethyl chloride, methyl chloride and methylene chloride cyclic organic compounds, nitrogen compounds and unsaturated organic compounds. Such propellants for dispensing products preferably should be conveniently liquefiable by a charging pressure of from 5 to 100 psig at a temperature of $32°$ to $100°$ F., or by cooling at a temperature of between $32°$ F. and $50°$ F. The propellant may be blended with a non-liquefiable gas at the normal use temperature range of the containers. Such gases may include nitrogen, helium, argon, carbon dioxide and other gases of a similar nature which are not liquefiable at the pressures and/or temperature normally encountered. One reason for blending a non-liquefiable gas with the liquefiable propellant is to prevent cracking of the flexible wall of the container. When the container is to be reused, the flexible wall must be capable of being collapsed and expanded repeatedly without developing cracks or leaks. The non-liquefiable gases blended with the liquefiable gases prevent collapse of the bag beyond a certain point and thus prevent sharp creases from being formed in the flexible bag which may develop cracks and leaks over a period of time.

The above temperature and pressure ranges for suitable liquefiable propellants are given for those consumer applications where tap water and/or refrigerators are the principal means of liquefying the propellants. For commercial and industrial applications, the pressure ranges would be much higher for high pressure systems.

In the embodiments illustrated in FIGS. 1–7, 10, 11 and 12, the flexible bag containing the propellant or blend of propellants with or without the non-liquefiable gas may be a flexible, multi-cellular material such as a multi-cellular foam wherein the liquefiable propellant is entrapped within the cells. The cells may be of open or closed type but preferably of the closed type. The cell wall is preferably impermeable to the propellant. If necessary, a lining or integral skin may cover the exterior of the foam material to contain the propellant.

For fluid reservoir systems there is no limit on the propellant pressure as long as suitable liquefiable propellants can be found. The pressure range is generally much higher than those used in the product dispensing systems.

The containers described in FIGS. 1–7, 10 and 11 can be used as a means of dispensing a multitude of liquid and/or semi-liquid products such as insecticides, herbicides, fertilizers, air fresheners, window washing compositions, oil and latex paints, perfumes, etc. The systems can also be used to supply water under pressure for portable showers or for drinking water for boats and recreational vehicles.

A further use of the concept described in the application is illustrated in FIG. 12 illustrating a pneumatic or hydraulic fluid system. Units which are structurally identical to FIG. 12 are manufactured by Greer Hydraulics, Inc. and are used as bladder accumulators. Bladder accumulators are used in hydraulic or pneumatic fluid systems as linkage compensators, thermal expansion compensators, fluid make-up devices, pulsation dampeners, hydraulic shock absorbers, holding devices, transfer barriers, fluid dispensers, etc. Referring to FIG. 12, the accumulator is inserted in a hydraulic or pneumatic line 140. The unit includes a shell 141 of metal or other suitable material having a fluid port 142 at one end thereof communicating through a suitable T fitting 143 with the hydraulic or pneumatic line 140. A flexible bladder 144 is permanently sealed and/or attached around the upper edge of the upper portion of the shell by conventional means known in the art. Communication with the bladder is through a valve 145. The bladder generally known to the art is charged with a non-liquefiable gas such as nitrogen, argon, helium, etc. to a pressure determined by the working pessures and loads handled by the fluid or pneumatic system. When used as a shock absorber, the bladder senses the shock pressure generated by the fluid system and absorbs it. A flexible cellular material as described in FIG. 11 may be used in lieu of the flexible bladder 144 in FIG. 12. One disadvantage of the accumulators which employ a non-liquefiable gas in the bladder is that the pressure-volume relation is not constant with pressure changes in the system.

Figure 13:
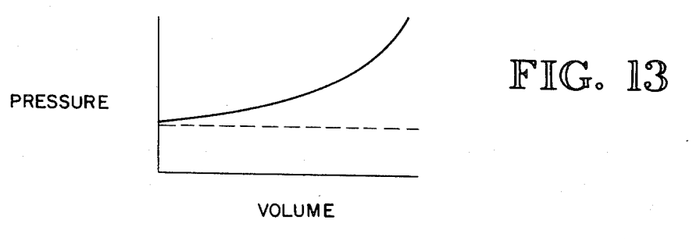
Figure 14:
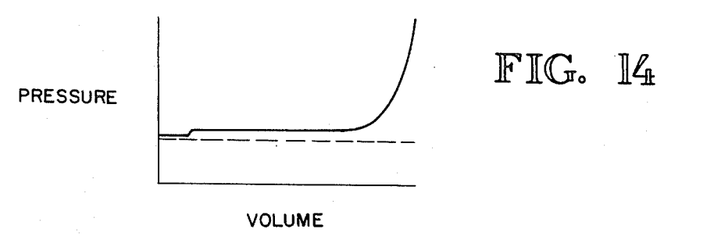

In the embodiment illustrated in FIG. 12 the bladder is charged with a liquefiable propellant gas or a blend of liquefiable propellant gases and a non-liquefiable gas. The advantage of using a liquefiable propellant gas which is liquefiable at the pressures and temperatures which will be encountered by the unit in service will insure that the pressure of the system remains constant even though the fluid in the system is subjected to sudden shocks. If the pressure of the fluid system increases, liquefaction of a portion of the liquefiable gas in the bladder will occur sufficient to maintain the pressure of the fluid system substantially constant. This is illustrated by the comparative graphs of FIGS. 13 and 14. One advantage of such a unit, when used as a pulsation dampener or hydraulic shock absorber, is that mechanical shock occurs with less potential damage occurring to the system or machinery. Liquefiable gases which may be used include fluorocarbons, hydrocarbons and other liquefiable propellants described previously with regard to other embodiments.

What is claimed is:

1. A method of reservoiring or dispensing a fluid product from a container, comprising:

providing a closed container having an outlet opening therein, providing a product container having a flexible wall within the closed container, the product container in fluid communication with the outlet and holding the product to be dispensed, enclosing a liquefiable propellant or mixture of liquefiable propellant and non-liquefiable gas in a separate, sealed compartment having a flexible wall, the sealed compartment positioned within the closed container out of contact with the product container holding the product to be dispensed, introducing a transfer fluid into the closed container for contact with the flexible wall of the compartment holding the liquefiable propellant or mixture of the liquefiable propellant and nonliquefiable gas and with the flexible wall of the container holding the product to be dispensed, the liquefiable propellant or mixture of liquefiable propellant and non-liquefiable gas exerting pressure on the product to be dispensed through the transfer fluid to cause exit of the product to be dispensed through the outlet opening.

2. The method of claim 1 wherein the liquefiable propellant is a blend of liquefiable propellants selected from the group consisting of flourocarbons, aliphatic hydrocarbons, chlorinated hydrocarbons, cyclic organic compounds, nitrogen compounds and unsaturated organic compounds.

3. The method of claim 2 wherein the non-liquefiable gas is one select group consisting of nitrogen, argon, helium, carbon dioxide and mixtures thereof.

4. The method of claim 1 wherein the fluid product is a liquid.

5. A pressurized fluid reservoir system capable of maintaining the pressure of the fluid system substantially constant, comprising:

a fluid reservoir connected to a source of fluid under pressure, a flexible sealed compartment within the reservoir containing a compressible and liquefiable material selected from the group consisting of a liquefiable propellant, a blend of liquefiable propellants, a mixture of a liquefiable propellant or blend thereof and a non-liquefiable gas, the propellant or blend of propellants liquefiable under the pressure conditions to which the pressurized fluid system will likely be subjected.

6. The fluid system of claim 5 wherein the sealed compartment is a flexible bag containing the compressible and liquefiable propellant.

7. The fluid system of claim 5 wherein the sealed compartment is a multicellular foam material having an exterior covering which is substantially impermeable to passage of the propellant therethrough, the cells of the foam material containing the compressible and liquefiable propellant.

8. The fluid system of claim 7 wherein the covering is an integral skin layer of the foam.

9. The fluid system of claim 7 wherein the multicellular foam material is one selected from the group consisting of closed cell foams and open celled foams.

10. A method of making a pressurized fluid system where a liquefiable propellant gas exerts pressure on the fluid, comprising:

forming a resilient, multi-cellular foam having an exterior covering substantially impermeable to the passage of the liquefiable propellant therethrough, using a liquefiable propellant as the means of forming the cells of the foam, transferring the foam into a container therefor, and contacting the foam with a fluid under pressure sufficient to liquefy the liquefiable propellant contained in the cells of the foam.

11. The method of claim 10 wherein the exterior covering is an integral skin layer of the foam.

12. The method of claim 10 wherein the exterior covering is a lining substantially impermeable to the passage of the liquefiable propellant therethrough.

13. A method of making a pressurized fluid system where a liquefiable propellant gas exerts pressure on the fluid, comprising:

providing a container having a release agent coating the interior thereof, forming a resilient, multi-cellular foam within the container using a liquefiable propellant as the means of forming the cells of the foam, and contacting the foam with a fluid under pressure sufficient to part the expanded foam from the interior walls of the container and liquefy the propellent contained in the cells of the foam.

14. The method of claim 13 wherein the foam is formed with an exterior covering substantially impermeable to the passage of the liquefiable propellant therethrough.

15. A pressurized dispenser for dispensing a liquid or semisolid product without release of the propellant dispensing the product to the surrounding environment, comprising:

a container having an outlet for the product, a product container surrounding the outlet within the container holding the product to be dispensed, the product container having a flexible and collapsible wall, a closed, collapsible propellant chamber within the container holding a compressible and liquefiable propellant therein liquefiable under the influence of temperature, pressure, or both, the chamber adapted to expand on vaporization of the propellant, and means for introducing a transfer fluid under pressure into the container to surround both the propellant chamber and product container so that expansion of the propellant in the propellant chamber exerts a pressure on the product to be dispensed through the transfer fluid to force the product from the container through the outlet.

16. The dispenser of claim 15 wherein the compressible and liquefiable propellant is selected from the group consisting of a liquefiable propellant, a blend of liquefiable propellants, and a mixture of a liquefiable propellant or blend thereof, and a gas which is non-liquefiable under the pressure and temperature conditions to which the dispenser will likely be subjected.

17. The product dispenser of claim 15 wherein the propellant chamber is free of any attachment to the container and is positioned in the lower portion thereof and wherein the product container is positioned in the upper portion of the container surrounding the outlet.

18. The dispenser of claim 15 wherein the product to be dispensed is introduced into the product container through the outlet.

* * * * *